United States Patent [19]
Graham

[11] 3,869,108
[45] Mar. 4, 1975

[54] WELDED VALVE BODY CONSTRUCTION
[75] Inventor: Donald E. Graham, San Leandro, Calif.
[73] Assignee: Valve Systems International, Inc., Bala Cynwyd, Pa.
[22] Filed: Jan. 7, 1974
[21] Appl. No.: 424,541

[52] U.S. Cl. ............................ 251/366, 29/157.1 R
[51] Int. Cl. ............................................ F16k 27/10
[58] Field of Search ............ 251/309, 315, 366, 367; 29/157.1

[56] References Cited
UNITED STATES PATENTS

| | | | |
|---|---|---|---|
| 3,195,857 | 7/1965 | Shafer | 251/315 X |
| 3,235,226 | 2/1966 | Allen | 251/315 X |
| 3,367,359 | 2/1968 | Johnson | 251/315 X |
| 3,584,641 | 6/1971 | Milleville et al. | 251/315 X |
| 3,666,237 | 5/1972 | Piccardo | 251/367 |
| 3,678,556 | 7/1972 | Shafer | 29/157.1 R |
| 3,792,835 | 2/1974 | Shafer | 251/309 |

Primary Examiner—Charles J. Myhre
Assistant Examiner—Ira S. Lazarus
Attorney, Agent, or Firm—Melvin R. Stidham, Esq.

[57] ABSTRACT

The disclosure is of a fabricated ball valve body having a cylindrical center section with bearing blocks, which are welded therein, rotatably receiving the trunnions of a valve ball. Tubular end closures, of the same diameter at their inner ends as the center section, taper inward toward their outer ends to receive hubs welded therein. Support blocks are welded into the end closures so that when they are welded to the center section, the support blocks engage the bearing blocks and transmit trunnion loads therefrom to the downstream end closures.

4 Claims, 7 Drawing Figures

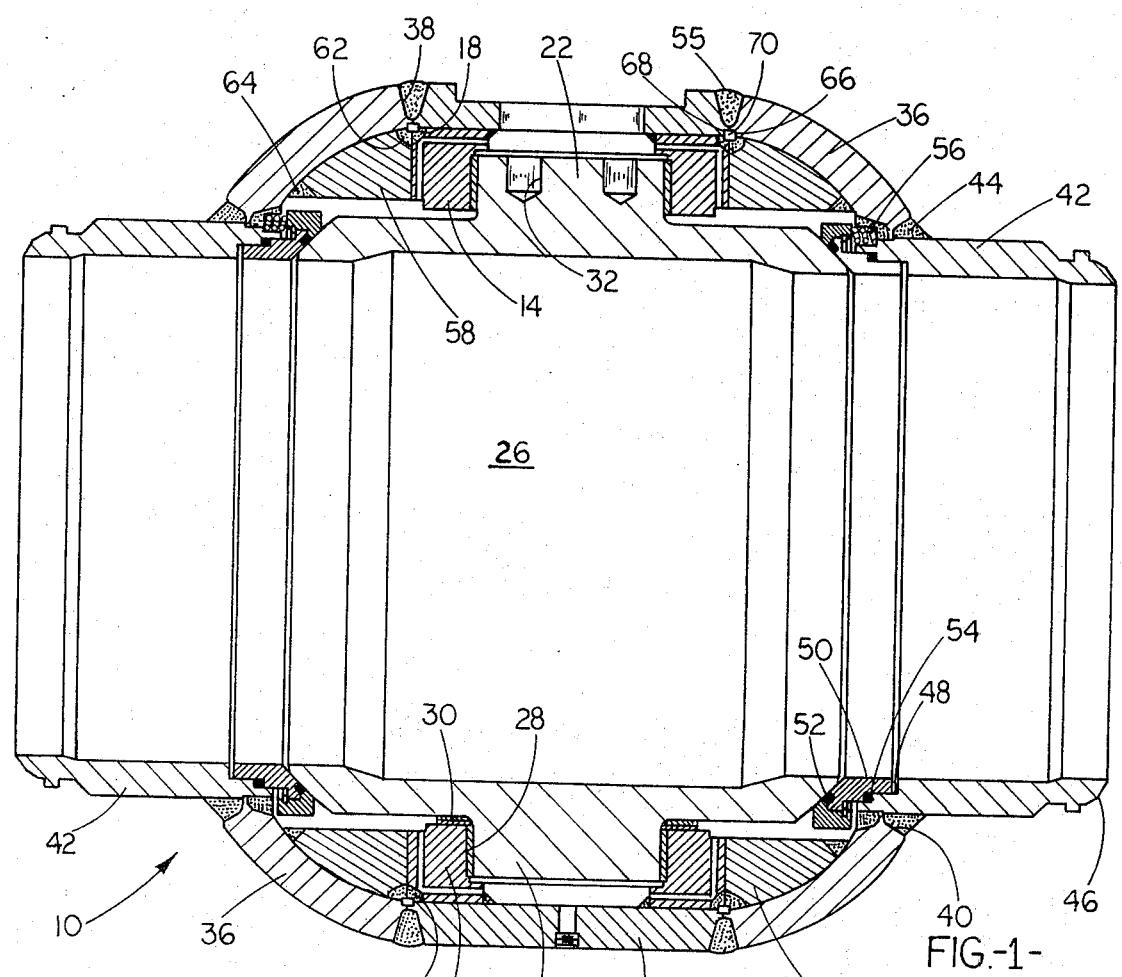
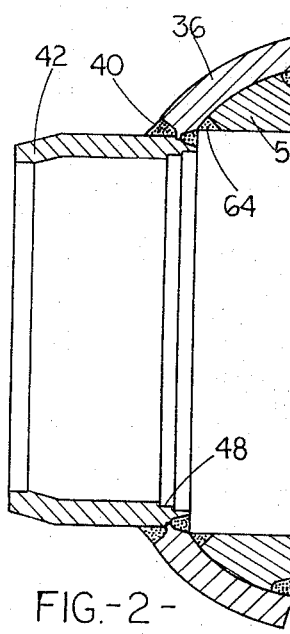
FIG.-2-
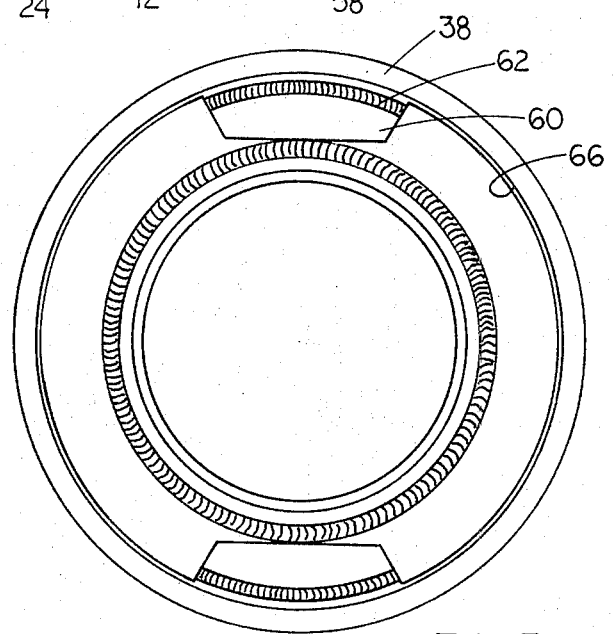
FIG.-3-

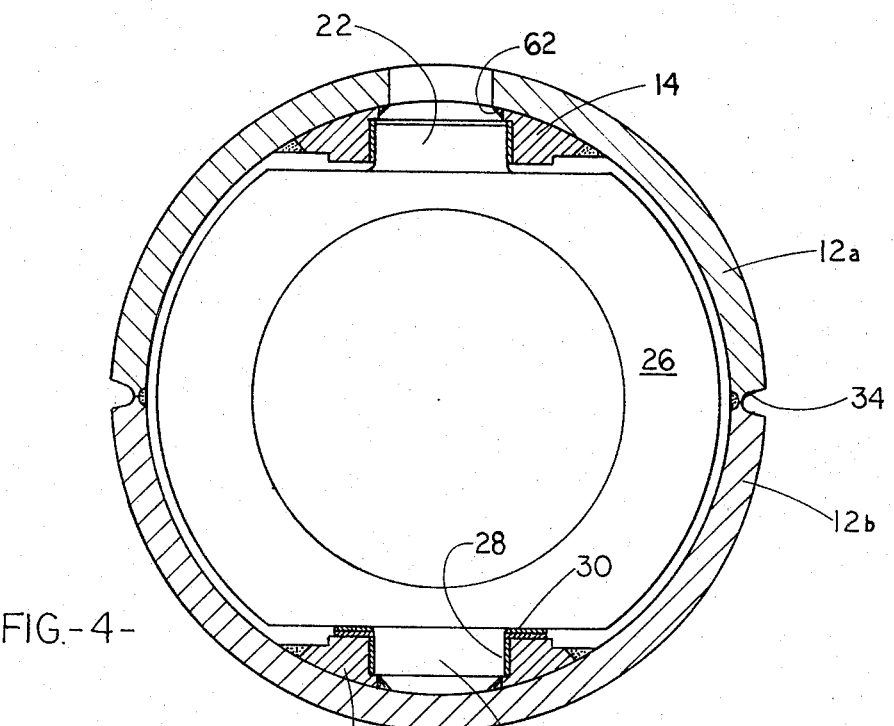
FIG.-4-
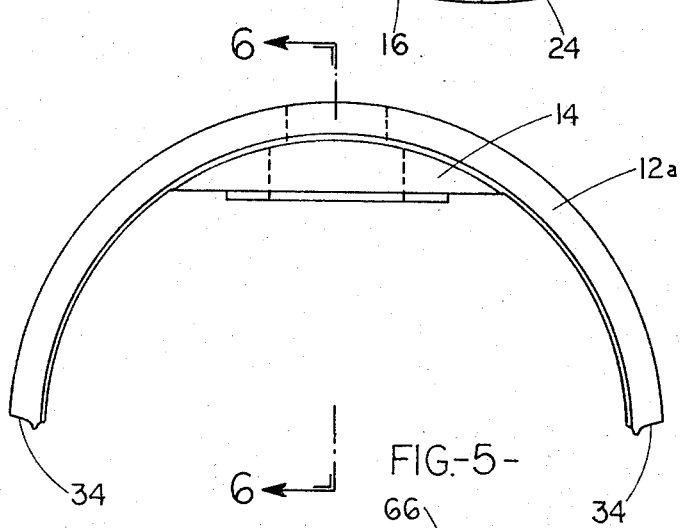
FIG.-5-
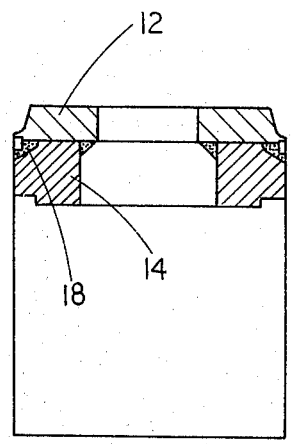
FIG.-6-
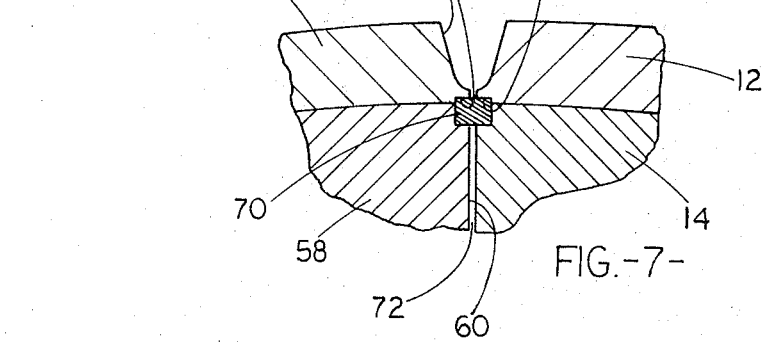
FIG.-7-

WELDED VALVE BODY CONSTRUCTION

BACKGROUND OF THE INVENTION

Available in the pipeline industry is a welded body ball valve wherein bearing blocks are welded into the body to receive the ball trunnions. When resilient seals are employed, it is necessary that any welding which may be necessary after the seals are in place be done far enough from the seal so that the heat of welding does not melt or otherwise deteriorate the resilient seals. An available welded body fabricated ball valve has a rather narrow cylindrical central body section carrying bearing blocks in which are rotatably mounted the ball trunnions. In manufacture, tapered end closures, to which are welded hubs with seat rings carried therein are welded at their large diameter ends to the opposite annular sides of the central section. Because the central section is relatively narrow, the seat rings and, hence, the resilient seals carried therein are sufficiently remote that heat of welding is well dissipated before reaching the resilient seals.

It has been determined, however, that for high pressure service, the relatively narrow central body section does not leave room for placement of a sufficient weldment around the bearing block to take the high trunnion loads. While this weld may be possible with a wider central body band, this would bring the end closure welds closer to the resilient seals and, hence, increase the possibility of damage thereto. In addition, the added weldment would render machining more difficult.

OBJECTS OF THE INVENTION

It is an object of this invention to provide a welded body ball valve, having a relatively narrow central body band to which bearing blocks are welded, with means for reinforcing the weldment against trunnion loads.

It is a further object of this invention to provide a welded body ball valve, having a central body band to which bearing blocks are welded, with means for transferring trunnion loads to the downstream end closure.

It is a further object of this invention to provide a welded body ball valve, having a relatively narrow central body band with bearing blocks welded therein and tapered end closures, with reinforcing means which are brought to bear against the bearing blocks after the end closures are welded to the body band.

Other objects and advantages of this invention will become apparent from the description to follow when read in conjunction with the accompanying drawings.

BRIEF SUMMARY OF THE INVENTION

In carrying out this invention, bearing blocks are welded into each of a pair of relatively narrow semicylindrical central body band sections. The bearing blocks are then placed over the trunnions of a valve ball and the ends of the body band sections are welded together along the edges thereof. Tapered end closures are formed from cylindrical tubes of the diameter of the body band and the other ends are swaged inward to receive generally cylindrical hubs which are welded therein. Seat ring assemblies are slidably received in recesses cut into the inner ends of the hubs whereby, when the end closures are welded to the central body section, the seat rings are displaced from the weld a sufficient distance to permit dissipation of heat and reduction of temperatures to a level below critical temperatures for resilient seals carried by the seat rings.

Prior to placing the seat ring assemblies, back-up blocks are welded into the end closures at points therein to be aligned with the bearing blocks. Complementary grooves are cut into the end faces of the central body band and the end closures to jointly receive a spacer ring which provides some clearance between body band and end closures prior to placement of the weld. When the weld cools, it shrinks and draws the end closures and body section closer together to bring the bearing back-up blocks into firm engagement with the bearing blocks.

BRIEF DESCRIPTION OF THE DRAWINGS

In the drawings:

FIG. 1 is a vertical section view of a fabricated, welded body ball valve embodying features of this invention;

FIG. 2 is a vertical section view of an end closures prior to assembly;

FIG. 3 is an end view of the end closure;

FIG. 4 is a vertical section view of the central body band during assembly, with the ball trunnions received therein;

FIG. 5 is an view of a body band section;

FIG. 6 is a section view taken along Line 6—6 of FIG. 5; and

FIG. 7 is an enlarged partial section view of the joint between end closure and body band prior to placement of the weld therebetween.

DESCRIPTION OF A PREFERRED EMBODIMENT

Referring now more particularly to FIG. 1, the ball valve 10 of this invention includes a cylindrical central body band 12 into which diametrically opposed, top and bottom bearing blocks 14 and 16 are welded at 18 and 20. The bearing blocks rotatably receive trunnions 22 and 24 carried on a valve ball 26 with rotary and thrust bearings 28 and 30 being provided to facilitate turning of the ball by means of a stem (not shown) which may be coupled by engagement in sockets 32 in the upper trunnion 22. As shown in FIG. 4, the central body section 12 is formed of two semi-cylindrical sections 12a and 12b so that the bearing blocks 14 and 16 may be placed over the trunnions 22 and 24 and the sections welded together at their ends 34.

A pair of tapered end closures 36 are formed from a generally cylindrical tubular member of the same diameter at their inner ends 38 as that of the central body band 12 but with the outer ends 40 swaged inward whereby cylindrical hubs 42 may be welded therein at 44. As shown, the hubs may be machined at their outer ends 46 for welding into a pipeline (not shown), or any other suitable means such as pipe flanges may be provided to permit installing the valve in a pipeline.

An annular recess 48 is cut into the inner end of the hub to slidably receive a seat ring assembly 50 carrying resilient seals, such as O-rings 52 and 54, to seal against the valve ball 26 and the hub 42, respectively. The seat rings 50 are urged outward, by means of springs 56 around the circumference thereof, into sealing engagement with the ball 26. Because the end closures 36 are completely formed before the seat rings are placed therein, none of the welding operations involved in fabrication of the end closure has any deleterious effect upon the resilient seals 52 and 54. Then, after the end closures 36 are fabricated and machined, and the seat rings 50 are mounted therein, they are welded at 55 to the central body band. The welds 55 are sufficiently removed from the seat rings that heat of welding is dissipated throughout the end closures without damaging the resilient seals. However, because of the desire to keep the central body band 12 narrow, a limitation is necessarily imposed upon the amount of weld 18 and 20 to be placed around the bearing blocks 14 and 16, with the result that such welds may be subjected to overloading under high pressure operation.

Referring now to FIGS. 2 and 3, during the fabrication of each end closure 36 a back-up block 58 having an outer bearing surface 60 is welded at 62 and 64 into the end closure 36 at locations on the circumference thereof which will bring them into circumferential alignment with the bearing blocks 14 and 16 during assembly. A recess 66 is cut in the annular end 38 of each end closure 36 and a like complementary recess 68 is cut in each annular edge of the central body band 12, together to receive a spacer ring 70 (FIG. 7) when the components are brought together. Then, the weld 55 is placed in the groove formed between the central body band 12 and the end closure 36. When the weld cools, it shrinks to bring the body sections closer together to close the gap 72 and bring the back-up blocks into firm compressive engagement with the bearing blocks 14 and 16.

When the valve 10 is in service in the line and in closed position under high pressure, loads imposed on the trunnions 22 and 24 as a result of the high pressure, are transmitted directly from the bearing blocks 14 and 16 to the downstream back-up block 58 and, through it, distributed over the downstream end closure 36.

While this invention has been described in conjunction with a preferred embodiment thereof, it is obvious that modifications and changes therein may be made by those those skilled in the art without departing from the spirit and scope of this invention.

What is claimed as invention is:

1. A fabricated quarter turn valve comprising:
   a rotary plug member having opposite coaxial trunnions thereon;
   a relatively narrow cylindrical central body band section;
   a pair of bearing blocks welded in said central section and rotatably receiving said trunnions;
   a pair of tapered tubular end closures, each of substantially the diameter of said central sections at its inner end and reduced to a smaller diameter at its outer end;
   valve sealing means including resilient seal members carried adjacent said outer end;
   a pair of support blocks welded into at least one of said end closures at diametrically opposite portions thereof; and
   a pair of welds joining said inner ends and said central section so that said support blocks engage corresponding sides of said bearing blocks.

2. The fabricated quarter turn valve defined by claim 1 including:
   narrow spacer rings between said inner ends and said central section to space said support blocks from said bearing blocks temporarily prior to placement of said pair of welds.

3. The fabricated quarter turn valve defined by claim 1 including:
   a pair of hub members welded into the outer ends of said end closures.

4. The fabricated quarter turn valve defined by claim 3 including:
   annular recesses formed in the inner ends of said hub members; and
   seat rings carried in said recesses for sealing engagement with said plug member.

* * * * *